(12) United States Patent
Kamp

(10) Patent No.: US 6,283,511 B1
(45) Date of Patent: Sep. 4, 2001

(54) PIPE COUPLING

(75) Inventor: Gerrit Pieter Kamp, Delft (NL)

(73) Assignee: Well Engineering Partners, B.V., Vries (NL)

( * ) Notice: Subject to any disclaimer, the term of this patent is extended or adjusted under 35 U.S.C. 154(b) by 0 days.

(21) Appl. No.: 09/139,005

(22) Filed: Aug. 24, 1998

(51) Int. Cl.[7] .................................................... F16L 35/00
(52) U.S. Cl. ...................... 285/391; 285/334.4; 285/360; 285/401
(58) Field of Search ................................ 285/334.4, 360, 285/376, 401, 391

(56) References Cited

U.S. PATENT DOCUMENTS

| | | |
|---|---|---|
| Re. 30,647 | 6/1981 | Blose . |
| 906,217 * | 12/1908 | Gaylord ................................ 285/391 |
| 1,372,238 * | 3/1921 | Kreiter ................................ 285/391 |
| 1,507,877 * | 9/1924 | Wilson ................................ 285/391 |
| 1,539,287 * | 5/1925 | Wilson ................................ 285/391 |
| 1,614,815 * | 1/1927 | Wilson ................................ 285/391 |
| 1,629,058 * | 5/1927 | Wilson ................................ 285/391 |
| 1,645,032 * | 10/1927 | Wilson ................................ 285/391 |
| 1,671,458 * | 5/1928 | Wilson ................................ 285/391 |
| 2,029,609 * | 2/1936 | Burns et al. ........................ 285/391 |
| 2,066,956 * | 1/1937 | Williams ............................. 285/391 |
| 2,172,602 * | 9/1939 | Williams ............................. 285/391 |
| 2,673,751 * | 3/1954 | Finch ................................... 285/391 |
| 3,540,762 | 11/1970 | Dunlap . |
| 3,895,829 | 7/1975 | Manson . |
| 3,922,009 * | 11/1975 | Giebeler .............................. 285/391 |
| 4,161,332 | 7/1979 | Blose . |
| 4,260,180 | 4/1981 | Halushka et al. . |
| 4,406,485 | 9/1983 | Giebeler . |
| 4,426,105 | 1/1984 | Plaquin et al. . |
| 4,549,754 | 10/1985 | Saunders et al. . |
| 4,661,029 | 4/1987 | Miller . |
| 4,662,659 | 5/1987 | Blose et al. . |
| 4,688,832 | 8/1987 | Ortloff et al. . |
| 4,822,081 | 4/1989 | Blose . |
| 5,403,043 | 4/1995 | Smet . |
| 5,423,579 | 6/1995 | Blose et al. . |
| 5,454,605 | 10/1995 | Mott . |

FOREIGN PATENT DOCUMENTS

| | | |
|---|---|---|
| 67 11 228 | 2/1968 | (NL) . |
| WO 92/06322 | 4/1962 | (WO) . |

* cited by examiner

*Primary Examiner*—Eric K. Nicholson
(74) *Attorney, Agent, or Firm*—Kinney & Lange, P.A.

(57) ABSTRACT

A pipe coupling has coupling members provided with a pin and a box. The outer surface of the pin is provided with axially extending columns of teeth, separated by free slots, and the inner surface of the box is provided with axially extending columns of counter teeth, also separated by free slots. To connect the coupling, the pin is axially inserted into the box and rotated over a fraction of a full turn to make the engagement surfaces of the teeth engage with the corresponding engagement surfaces of the counter teeth, thereby creating an axial pre-tension between the pin and the box. The design of the teeth is differentiated over the length of the pin and the box to be adapted to differences in loads during make-up and in use and the coupling is protected against release and overturning.

21 Claims, 4 Drawing Sheets

PIPE COUPLING

TECHNICAL FIELD

The invention relates to the field of pipe couplings, and more in particular to the field of pipe couplings for coupling pipes to be used in subterranean drilling and other operations involved in the preparation of subterranean bore holes.

BACKGROUND ART

In drilling for oil and other subterranean resources, generally a rotary drilling system is used in which a drill string is composed of pipe members which are successively linked to the string and lowered into a bore hole as drilling progresses. Generally, the drill string has to be removed out of the bore hole several times which involves disconnecting and reconnecting the pipe members forming the drill string. The need of connecting pipes also occurs when a casing is brought into bore hole.

Usually the pipe members each have a threaded, conical pin and a threaded box of a corresponding shape and size. Subsequent pipe members are connected to each other by screwing the pin of a subsequent pipe member into the box of an upper pipe member of a pipe string. Typically, connecting two pipe members requires careful positioning of the pin into the box to avoid damage to the threads, 5 to 10 complete rotations of the pin relative to the box and accurate control of the applied make-up torque. During the time required to carry out these operations, the drill string is not rotating. Particularly during drilling the interruption caused by the operation of connecting pipes is disadvantageous, because it allows mud in the drilling hole to settle. Due to this effect, a return to a steady drilling equilibrium is more difficult and takes more time the more the conditions in the drilling hole are allowed to diverge from the steady state drilling conditions.

Another disadvantage of such connections is that the conical design of the box and the pin reduces the size of the cross section in the coupling available to allow the passage of mud.

In spite of substantial efforts to provide couplings which are easier to operate and which allow to make connections more quickly, the above type of connections have remained the most widely used type of connection.

One example of a quick-connect/disconnect pipe coupling not specifically related to couplings to be used in field of drilling and completing well bores is disclosed in U.S. Pat. No. 5,403,043 to Smet. The connection is made-up of a pin and a box. The pin and the box are provided with interlocking fins and have axial slots between the fins allowing fins of the other coupling part to pass through in axial direction when a coupling is made or released. To make a connection, the pin is axially inserted in the box causing the fins of the pin and the box to pass in axial direction through slots left open between the fins of the other coupling part. Subsequently, the coupling parts are rotated relative to each other over in this example one eighths of a turn, causing the fins to engage each other. Because the fins do not engage during insertion and the coupling members have to be rotated over a relatively small angle only, the coupling can in principle be made very quickly.

However, a disadvantage of couplings having cooperating fins or teeth which are separated circumferentially to allow fins or teeth of the other coupling part to pass by in axial direction is that the load carrying surface of the threads is small compared to a coupling with continuous thread completely circumventing the coupling members. This in turn entails disadvantages in terms of the required size of the coupling, durability and reliability. These are important disadvantages in many applications, notably in the field of subterranean drilling.

In one embodiment, the coupling members are provided with saw tooth shaped teeth on the distal end face of the pin and on the bottom of the box. These tooth shaped teeth pass each other when a connection is made-up or released. This, in turn causes the pin to be pushed out of the box causing a substantial loading of the interlocking fins.

In U.S. Pat. No. 3,895,829 to Manson, Jr. a coupling is disclosed of which a pin member and a box member are each provided with interrupted threads. The threads are arranged so that the pin member can readily be fitted into the box member or removed therefrom when the threads are disengaged. It is preferred that the threads are pitched slightly to minimize the torque required to disengage the threads and to distribute tension loads uniformly to all threads. However, the thread lead can be counterclockwise or clockwise, or threads with no lead can be used. To lock the coupling in connected condition, an axially movable locking sleeve is provided which in one position engages both the box member and the pin member so that rotation of these members relative to each other is precluded. This coupling is of a relatively complicated design and specifically suitable for use in situations where the coupling needs to be disconnected remotely in the course of drilling or completing a well bore in subterranean formations.

U.S. Pat. No. 4,688,832 to Ortloff et al. discloses a pipe coupling with a pin and box member which, in contrast to the previously discussed couplings, are provided with continuous threads. When the coupling is in hand-tight condition, the clearances between sections of the continuous threads of the pin that are adapted to mate with selected sections of threads of the box are different for different sections of the thread. Thus, in made-up condition and under external loads a more uniform distribution of loads is obtained. However, during relative rotation of the coupling members from a hand-tight condition to a fully made-up condition some section are loaded during a larger portion of the rotation than other sections. During disconnection of the coupling, the sections which have engaged last during make-up disengage first. This entails that some sections wear more quickly than others, which is disadvantageous for the precisely applied differences in clearance and reduces the number of times a coupling can be connected and disconnected before reconditioning of the coupling is required.

U.S. Pat. Reissue No. 30,647 issued to Blose discloses a pipe coupling with a pin and box member provided with respectively matching continuous dove-tail threads. On the pin and box members the thread has a smaller pitch distance at the thread tip than at the thread root so that the threads are formed by helical wedges. When made-up the interlocking wedges mutually squeeze each other in axial direction so that the coupling can withstand the application of a large torque and the threads are functionally leak resistant. However, if axial pre-stress loads are applied, this does not contribute to distributing the axial pre-stress loads more evenly over different sections of the threads.

SUMMARY OF THE INVENTION

Accordingly it is an object of the invention to provide a compact pipe coupling that can be connected quickly but is nevertheless durable and reliable.

According to one aspect of the present invention, this object is achieved by providing a pipe coupling with a first coupling member having a pin with a free end and a second coupling member having a box with an open end, which coupling has the following features. The pin has an outer circumference provided with a plurality of teeth arranged in a plurality of circumferentially distributed axially extending columns defining slots between the columns. At least a plurality of the teeth are each provided with an engagement surface facing away from the free end of the pin. The box has an inner circumference provided with a plurality of counter teeth arranged in a plurality of circumferentially distributed axially extending columns defining slots between the columns. These slots are dimensioned to allow axial passage of teeth of the pin and the counter teeth are dimensioned to allow axial passage through the slots defined on the pin. At least a plurality of the counter teeth are each provided with an engagement surface facing away from the open end of said box. In coupled condition, the pin and the box extend coaxially. The engagement surfaces of the teeth and of corresponding ones of the counter teeth are formed to generate an axial pre-tension when the coupling members are mutually twisted in a make-up sense from a configuration in which the pin is inserted in the box and in which the teeth and counter teeth of each of the coupling members are located in slots defined between counter teeth and teeth of the other one of the coupling members. In this quick-connect pipe coupling, at least a plurality of the engagement surfaces extend in circumferential sense at sloping angles relative to a plane perpendicular to the axis of the pin or the box. At least two of the teeth of the same one of the columns have engagement surfaces extending at different sloping angles.

Thus, the angles of the engaging surfaces of the respective tooth and counter tooth can be adjusted to provide relative axial displacements of different axial sections of the pin and the box which are better adjusted to differences in load/displacement relations in different axial sections of the pin and the box. To avoid fatigue, the relative displacements can also be adjusted to differences in the amplitude of variations in load in different axial sections of the pin and the box. Thus, the axial pre-stress loads can be more evenly distributed over the teeth and/or be better adapted to the extent to which tooth loads vary in use.

Compared with a solution in which thread loads are influenced by providing different clearances between the threads in different axial sections of the coupling, a particular advantage of obtaining a more even load distribution by providing different sloping angles of the engagement surfaces is that during make-up and release of the coupling, the load increase and, respectively decrease can be distributed more evenly as well. When different clearances with essentially the same sloping angle are provided, the build-up of axial pre-stress load in different thread section occurs over different rotational angles.

In this coupling advantageous use is made of the insight that in interrupted thread couplings, the sloping angle of the engagement surfaces can be selected independently of the clearance between engagement surfaces in hand-tight condition.

If the pin projects from a portion of its coupling member carrying the axial abutment surfaces of the coupling which are pressed together when the coupling is made up, preferably the engagement surface of one of the at least two teeth which is closest to the distal end of the pin extends at a sloping angle steeper than the sloping angle of the engagement surface of at least another one of the at least two teeth of the same column, to accommodate for differences in displacement of different portions of the pin relative to the box under the same teeth load.

According to another aspect of the invention, the above object is achieved by providing the quick-connect pipe coupling in which at least a plurality of the teeth or counter teeth of each column of at least the pin or the box have at least one dimension which has a different value for each of that plurality of teeth or counter teeth in accordance with loads transferred through these teeth or counter teeth in connected condition. By providing teeth which are dimensioned in accordance with the loads to be transferred by the respective teeth, advantageous use is made of insight that in couplings in which the thread portions form separate axial rows, the axial pitch between successive threads as well as dimensions of the teeth forming the thread portions can be varied over the length of the coupling. In such a coupling the stresses applied to material of the teeth can be distributed over the axial length of the coupling more evenly than the loads applied to the teeth.

According to a yet another aspect Of the invention this object, and in particular an improved reliability and ease of making up a coupling is achieved by providing a quick-connect pipe coupling in which leading ends of at least the teeth or counter teeth are mutually staggered in circumferential sense such that, if the coupling members are mutually twisted in make-up sense from a configuration in which the pin is inserted in the box and in which the teeth and counter teeth of each of said coupling members are located in slots defined between counter teeth and between teeth of the other one of the coupling members, the teeth and counter teeth start to overlap one by one. This causes the make-up torque to increase more gradually when mutual rotation of the coupling members is started to make-up the coupling.

According to a further aspect of the present invention, the above object, and in particular the reliability of the coupling in terms of resistance against unintentional disconnection is achieved by providing a quick-connect pipe coupling in which at least one of the teeth of the pin and at least one of the counter teeth of the box engaging that tooth of the pin when the coupling members are in coupled condition are provided with co-operating retainers which counteract mutual twisting of the coupling members from the coupled condition in a sense opposite the make-up sense.

The retainer further improves the resistance against releasing the made-up coupling by adding an extra resistance force to the force formed by the friction resulting from the axial pre-tension of the coupling. Moreover, by using a retainer the pre-tension load of the teeth and counter teeth required to achieve sufficient resistance against unintentional releasing of the coupling size is reduced. Since the retainers are provided as portions of the teeth, the retainers can engage while making use of flexibility of the teeth, thereby avoiding substantial axial displacement of the pin and the box relative to each other and entailing the exertion of associated loads onto the teeth. Thus, the reliability and durability of the coupling is improved.

According to a further aspect of the present invention, the above object, and in particular an improved ability to withstand the application of an excessive make-up torque is achieved by providing a quick connect pipe coupling in which the coupling members are each provided with an abutment surface facing in make-up sense, the abutment surfaces being in contact with each other when the coupling members are in coupled condition, limiting mutual rotation of the coupling members in make-up sense beyond a predetermined configuration and each being integrally formed with the pin or the box.

The presence of abutments limiting rotation of the coupling members relative to each other in make-up Sense substantially reduces the accuracy with which the make-up torque has to be controlled to obtain a reliable make-up without damaging the teeth. Since the abutment surfaces are integrally formed with the pin or the box, a particularly reliable construction is obtained which, even at small dimensions, can withstand a large torque.

Preferably, at least one of the abutment surfaces is formed by an axially projecting portion of one of the teeth or counter teeth, so that the respective tooth fulfills a dual function of contributing to axially tensioning the coupling and of supporting the abutment surface limiting relative rotation of the coupling members.

The abutment surfaces are preferably each formed on a radial projection within axial contours of one of the columns of teeth or counter teeth of the respective coupling member, so that the abutment surfaces can be provided without substantially increasing the complexity of the construction of the coupling and its manufacture.

The foregoing and other objects and features of the present invention are further described in and may be more readily understood from the following detailed description in conjunction with the accompanying drawings.

DETAILED DESCRIPTION

Figure 1:
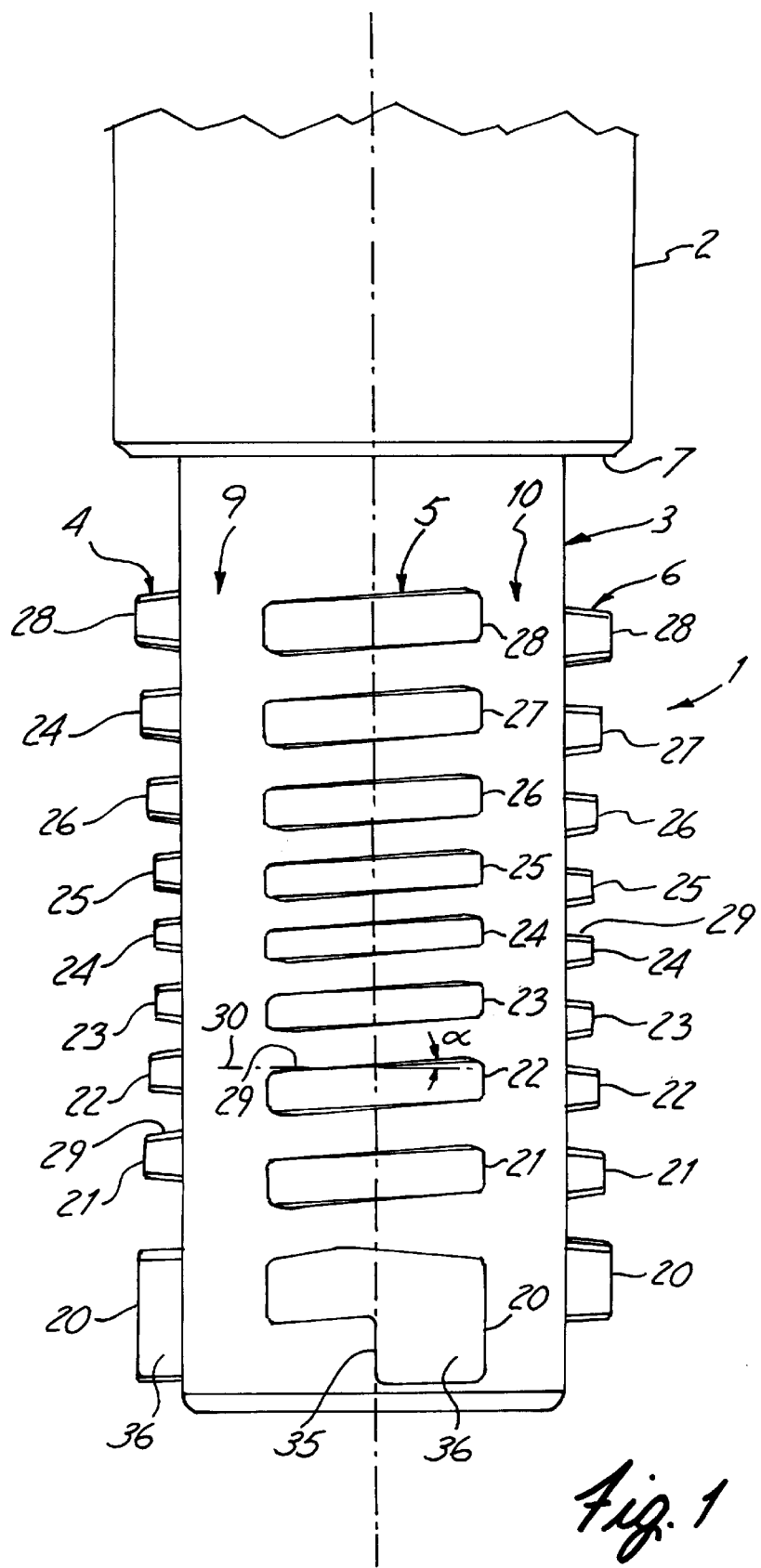
FIG. 1 is a side view of a pin of a coupling according to an embodiment of the invention.
Figure 2:
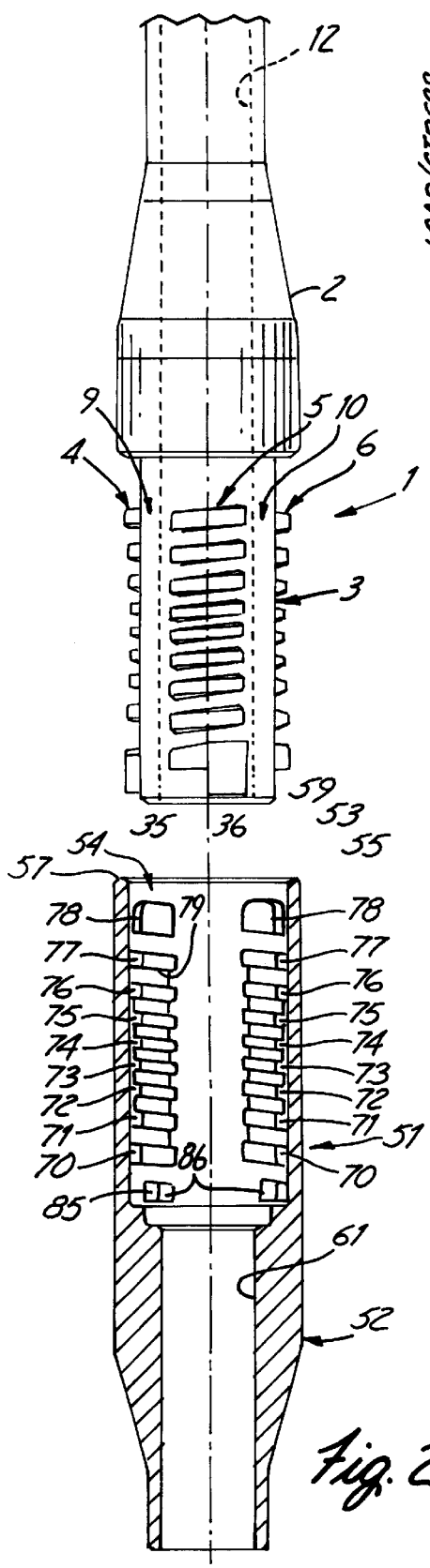
FIG. 2 is a side view of a coupling according to an embodiment of the invention in uncoupled condition, a box of the being shown in sectional view and the pin being the pin as shown in FIG. 1.
Figure 3:
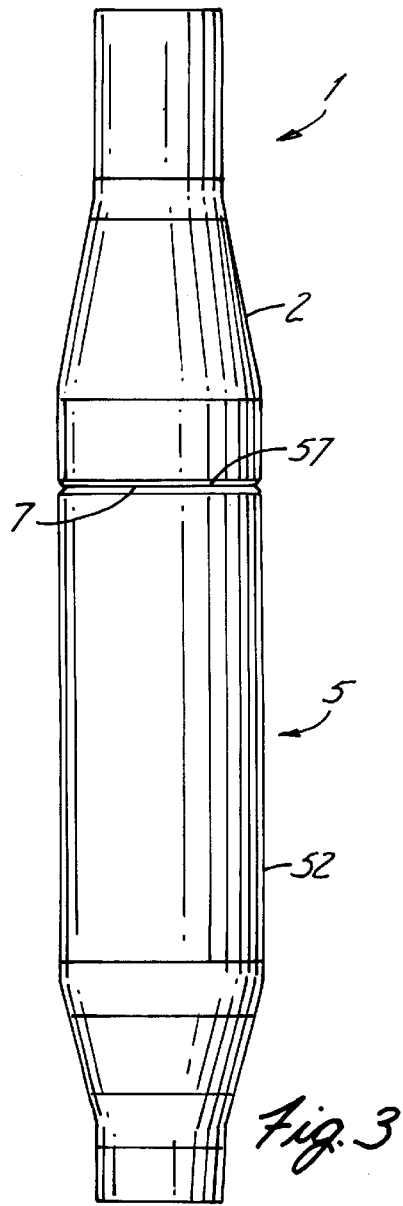
FIG. 3 is a side view of the coupling according to FIG. 2 in coupled condition.

The coupling shown in FIGS. 1–3 represents the presently most preferred embodiment of the invention. This coupling is composed of a first coupling member 1 and a second coupling member 51. Both coupling members 1, 51 are provided with an axial bore 11, 61 with opposite open ends. When the coupling members 1, 51 are in connected condition, the bores 11, 61 are in line and define a conduit traversing the coupling.

The first coupling member 1 has a base portion 2 and a pin 3 projecting in axial direction from the base portion 2. The other end of the base member is adapted to be connected to a pipe or to another device of a generally cylindrical or at least elongated shape such as a connecting portion of a tool, for instance by inserting an end portion of the pipe or other device into the bore 11 or by inserting the base portion 2 into the end of a pipe or other device. This connection can be accomplished in a conventional manner and is not described here. At the base of the pin, the distal end of the base portion 2 forms a shoulder 7. On its shell surface, the pin 3 is provided with three axially extending columns of teeth 4, 5, 6. It has been found that, at least generally, the number of columns is preferably three. If the number of columns would be two, this would entail high peak load near the beginning and the end of each tooth. A larger number of slots would generally make the coupling more vulnerable to damage and wear and reduce the angle over which the coupling can be twisted to bring teeth and counter teeth opposite to each other. Nevertheless, in principle other numbers of columns can be provided as well.

The columns 4, 5, 6 are evenly distributed in circumferential sense, leaving open axially extending slots between the columns 4, 5, 6. Two of these slots 9, 10 are visible in FIGS. 1 and 2. The three columns are identical to each other to balance the loads exerted onto the pin and the box about the central axis thereof and to allow the pin to be inserted into the box in three mutually aligned orientations. However, it is also possible to provide mutually different columns, for instance to introduce load in axially staggered areas. In this embodiment each one of the columns comprises nine teeth 20–28. In other situations, depending an the load to be transferred and the diameter and material of the coupling, other numbers of teeth may be more suitable.

The second coupling member 51 has a housing 52 of which a proximal end is adapted to be connected to a pipe as well. The housing 52 is provided with a box 53. On its inner shell surface, the box 53 carries three axially extending columns of teeth 70–78, of which two columns 54 and 55 are visible in the cross-section shown in FIG. 3. The columns 54, 55 define slots 59 of which the width and the depth corresponds to the width (in circumferential sense) and the height (in radial sense) of the teeth 20–28 of the pin 3. In FIG. 2, only one of these slots 59 is visible.

The distal end surface of the housing 52 forms a sealing surface 57 which is pressed against the shoulder 7 of the first coupling member 1 when the couplings 1, 51 are in connected condition. The pressure of the sealing surface 57 against the shoulder 7 is obtained by pre-stress generated by mutually engaging teeth 20–28 and 70–78 when coupling has been made up.

The teeth 20–28 of the columns 4, 5, 6 of the pin 3 are arcuately shaped and protrude radially outward from the shell surface of the pin 3. Each of the teeth 20–28 is provided with an engagement surface 29 facing away from the distal end of the pin 3. In FIG. 1 only some of the engagement surfaces have been designated by a reference numeral. The engagement surfaces 29 are inclined at angles α with respect to a surface 30 perpendicular to the axis of the pin 3. The same applies to engagement surface 79 of the counter teeth 70–78 within the box 53.

To connect the coupling members 1, 51, first the coupling members 1, 51 are axially aligned, with the distal end of the pin 3 facing the open end of the box 53. In rotational sense about the central axis, the pin 3 is positioned so that the columns 4, 5, 6 of teeth 20–28 are in 25 alignment with slots 59 between the columns 54, 55 of teeth 70–78 of the box 53. It is noted that this is not the alignment shown in FIG. 3. In FIG. 3 the columns 4, 5, 6 of the pin 3 and the columns 54, 55 of the box are aligned with each other, which would essentially correspond to the rotational alignment in connected condition.

Next, the pin 3 is inserted into the box 53 until the shoulder 7 at the base of the pin 3 meets the sealing face around the open end of the box 53.

By subsequently applying a rotation of the pin 3 relative to the box 53, in this example in a clockwise sense, the teeth 20–28 of the pin 3 engage with the counter teeth 70–78 of the box 53. Due to the sloping angle α of the engagement surfaces 29, 79, a pre-stress pulling the pin 3 into the box 53 is thereby applied to the pin 3, completing the make-up of the coupling.

The coupling can be disconnected by applying a torque in the sense opposite to the make-up torque. Because of the small angle over which the engagement surfaces 29, 79 travel during closing, wear is accordingly low. Therefore the coupling according to the invention can be used many times before reconditioning becomes necessary.

The transfer of the connection forces through the coupling in made-up condition is through the forces transmitted by the co-operating engagement surfaces 29–79 of the teeth 20–28 and counter teeth 70–78. The forces are not equal for each tooth and depend on the axial position of the tooth within the coupling. In this example, the highest loads are transmitted by the teeth and counter teeth at the extremities of the pin 3 and the box 53, whereas the loads transmitted in the center of pin 3 and box 53 are relatively low.

Seen in transverse cross-section the teeth 20–28 and counter teeth 70–78 are slightly tapered from the base of the tooth connected to the pin 3 towards the free end. However, various other designs of the teeth and counter teeth, such as triangular, curved or sinusoidal cross-sections could be provided as well. The teeth of each column 4, 5, 6 and 54, 55 have mutually different dimensions in accordance with loads transferred through the teeth 20–28 or counter teeth 70–78 in connected condition. In this example, in which the coupling is pre-tensioned by compressing the shoulder 7 at the base of the pin 3 and the sealing face 57 at the distal end of the housing 52 containing the box 53 by pulling the pin 3 into the box 53 and accordingly compressing the walls of the box 53, the teeth 24 in a central area of the column are the smallest teeth and, from the central teeth 24 onwards, the size of each next tooth closer to the remote and distal ends of the pin 3 is larger than the size of the previous teeth.

Figure 4:
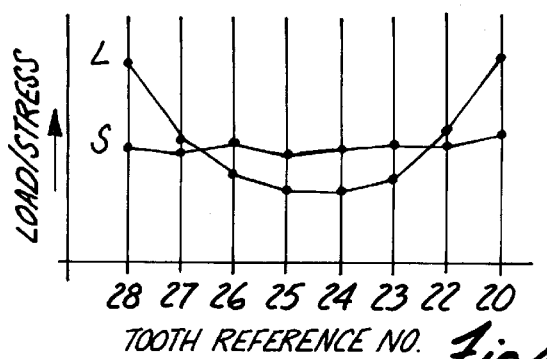
FIG. 4 is a graph showing the distribution of loads over teeth of a column.

As appears from FIG. 4 in which the line L represents the loads applied to different teeth 20–28 in connected condition and the line S represents the stresses applied to different teeth 20–28 (for instance in a most critical operating condition), due to the differences in size of the teeth 20–28, the stresses applied to the teeth are evenly distributed over all teeth although the loads applied to the teeth differ significantly from tooth to tooth. Since the highly loaded teeth are larger than the less highly loaded teeth, the stresses that occur in the teeth are equalized to a large extent. Accordingly, the coupling can be made very compact and/or is able to withstand a very high axial pre-tension.

The counter teeth 70–78 on the inner surface of the box 53 have widths, heights and lengths corresponding to the widths, heights and lengths of the teeth 20–28 of the pin 3 engaging these teeth when in connected condition.

If the actual distribution of loads over the teeth is different, or if a less accurate adaptation of the size of the teeth to the loads applied thereto is sufficient, other distributions of the sizes of the teeth can be selected accordingly. Such a situation occurs for example if, instead of a single seal at the base of the pin 3, a double seal in which the distal end of the pin is pressed in sealing contact with a shoulder in the box is provided. Such a configuration of seals brings about a different axial distribution of loads over the pin and the box and would therefore preferably be combined with a different distribution of the sizes of the teeth.

The dimensions of the teeth 20–28 which have values differing from each other are the height of the teeth 20–28, i.e. the distance over which the teeth protrude from the shell surface of the pin 3 and the width of the teeth, i.e. the distance the teeth extend in axial direction. An increase of the height of a teeth provides an increase of the effective size of the engagement surface, which is advantageous to limit the surface pressure between co-operating engagement surfaces 29, 79. An increase of the width of a teeth provides an increase of the resistance to shear and flexural loads.

The proposed adaptation of the sizes of the teeth to differences in loads applied to the teeth is particularly advantageous if the pin and the box are of an essentially cylindrical design which generally entails larger variations in tooth load over the length of the coupling than if the pin and the box are of a conical design. In principle, a cylindrical design provides the advantage that it occupies a relatively smaller proportion of the available cross section of the coupling so more room is left for a conduit through the coupling.

The feature that the engagement surfaces of teeth in different axial positions have different sloping angles can advantageously be combined with the feature that teeth in different axial positions are dimensioned differently. This allows to accommodate for remaining or deliberate differences in loads applied to different teeth in different axial positions.

Figure 5:
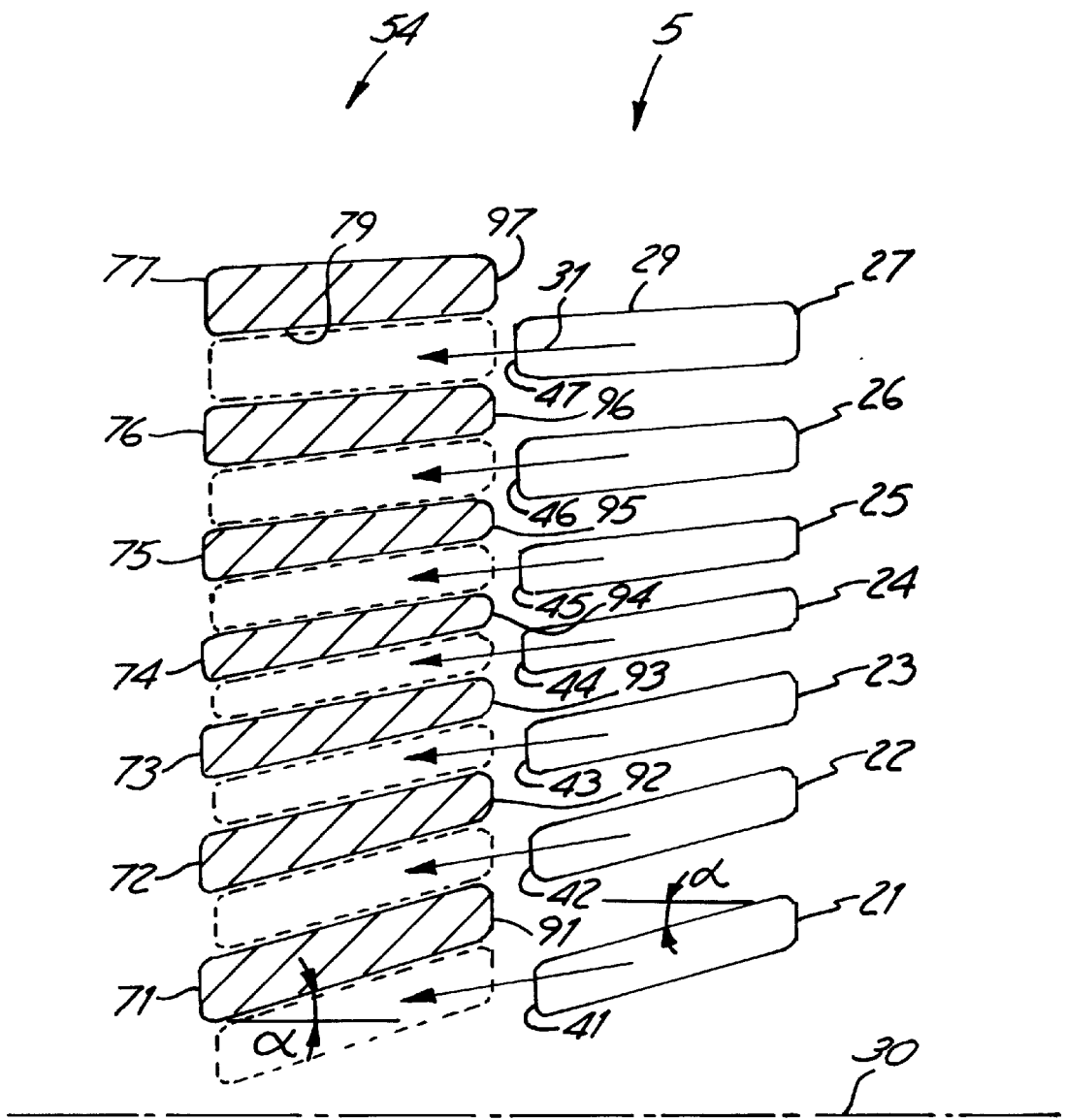
FIGS. 5–7 are schematic representations illustrating relative movement of teeth and counter teeth while coupling members are twisted in make-up sense.

FIG. 5 shows schematically some of the teeth 21–27 of the column 5 of the pin and some of the counter teeth 71–77 of the column 54 the box 53. The relative position of the columns 5 and 54 represent the positions immediately after insertion of the pin 3 in the box 53. The arrows 31 indicate the direction in which the shown portion of the pin 3 is moved to make-up the coupling. The positions of the teeth of the pin in coupled condition are shown in dashed lines.

The engagement surfaces 29, 79 of the teeth extend in circumferential sense at sloping angles a relative to the plane 30 perpendicular to the axis of the pin or the box. For the sake of clarity, in FIG. 5 these angles α are shown in an exaggerated representation The sloping angles α are different, for different ones of the teeth 20–28 and 70–78. This allows to tune the sloping angles to obtain a desired, for instance a more even, distribution over the length of the coupling of tooth loads to which the individual teeth 20–28 and counter teeth 70–78 are subjected. It is also possible to adapt the pre-tension loads to which individual teeth 20–28 and 70–78 are subjected to the amount of variation of the respective tooth loads in operation. Where these variations are larger, a larger pre-tension is advantageous to lower relative changes of tooth loads which helps to avoid failure due to fatigue.

As with respect to the differentiation of the sizes of the teeth 20–28, 70–78 over the length of the pin 3 and the box 53, the variation of the sloping angles α over the length of the pin 3 and the box 53 according to then present example is specifically adapted to the load/displacement relation of a coupling having the sealing surfaces at the outside. In such a coupling, it is advantageous for an even distribution of tooth loads, to provide that (as is shown in FIG. 5), preferably for each pair of teeth of a column 4, 5, 6, the sloping angle α of the engagement surface of the tooth closest to the distal end of the pin 3 extends at a sloping angle α steeper than the sloping angle α of the engagement surface of the tooth of that pair which is located closest to the proximal end of the pin.

To provide an even distribution of the load applied to a tooth it is further advantageous if the engagement surfaces 29, 79 of teeth 20–28 and corresponding counter teeth 70–78 which are mutually engaged when in coupled condition extend at mutually equal sloping angles α.

Differentiation of sloping angles over the length of the coupling is particularly advantageous for couplings in which the pin and the box are cylindrically formed, because in such couplings differences in tooth loads at mutually equal sloping angles are particularly large.

A particular advantage of providing different sloping angles a to control the tooth loads is that the relative angular position of the connection at which tooth loads of individual teeth start to build up during make-up can be individually controlled for each pair of co-operating teeth. Preferably this possibility is used to provide that leading portions in make-up sense of the engagement surfaces 29, 79 of the teeth 20–28 and said counter teeth 70–78 of the pin 3 and the box 53 are equally spaced in axial direction, such that pairs of the engagement surfaces 29, 79 of the teeth 20–28 and the counter teeth 70–78 which are engaged when in coupled condition engage or disengage essentially simultaneously when the coupling members are mutually twisted in tightening or untightening sense. Because for all teeth the teeth loads build up and decrease uniformly and proportionally during make-up and breaking of a coupling, wear of the teeth 20–28, 70–78 will be more uniformly distributed so that a longer lifetime of the coupling can be achieved. More in particular, wear of the teeth 20–28, 70–78 will have very little effect on distribution of the loads distribution over the teeth.

As is also shown in an exaggerated representation in FIG. 5, the teeth 21–27 and counter teeth 71–77 have ends 41–47 and, respectively 91–97 which are leading when the coupling members are twisted in the make-up sense (arrows 31). The leading ends 41–47 of the teeth 21–27 shown in FIG. 5 are mutually staggered in circumferential direction such that, when the coupling members are mutually twisted in the make-up sense from a configuration in which the pin 3 is inserted in the box 53 and in which the teeth 20–28 and counter teeth 70–78 of each of the coupling members are located in slots 9, 10, 59 defined between counter teeth 70–78 and teeth 20–28 of the other one of the coupling members, the teeth 20–28 and counter teeth 70–78 start to overlap one by one.

This causes the torque build-up at the start of the rotation of the coupling members relative to each other to be more smoothly. One of the teeth 27, 77 that engage first, in this example the tooth 27 of the pin 3 closest to the base of the pin has a more bevelled or rounded lead-in shape than the other teeth. Thus, only one of the teeth that actually lead the teeth to engage during make-up is rounded and the other teeth can have more sharp edges which facilitates manufacturing and is helpful to provide an effective engagement surface of maximum length. The one or two of the teeth with a more rounded or bevelled lead surface can advantageously be one or two of the more lightly loaded teeth. Instead of or in addition to the lead portions in make-up sense of the teeth 20–28 of the pin 3, the lead portions in make-up sense of the counter teeth 70–78 of the box can be arranged in rotationally staggered positions as well.

Figure 6:
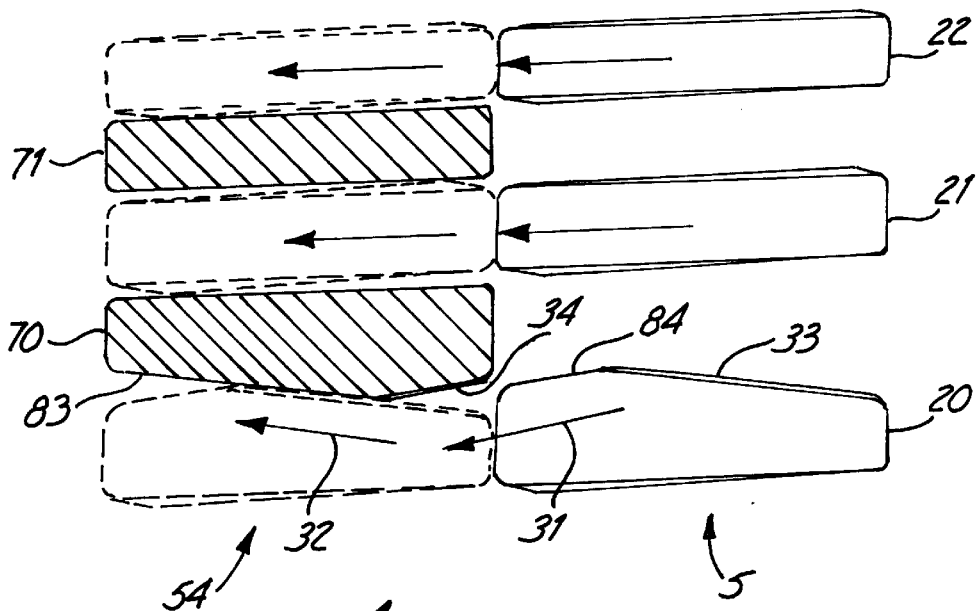

In FIG. 6, a schematic representation of the three most distal teeth 20, 21, 22 of a column 5 of the pin 3 and of the two most proximal teeth 70, 71 of a column 54 of the box 53 is shown. The arrows 31, 32, of which each time only one is designated by a reference numeral, show the movements of the teeth 20–22 of the pin 3 relative to the movements of the teeth 70, 71 of the box 53, The relative position of the columns 5 and 54 represent the positions immediately after insertion of the pin 3 in the box 53. The positions of the teeth of the pin in coupled condition are shown in dashed lines.

The most distal teeth 20 of the pin 3 and most proximal counter teeth 70 of the box 53 which engages that most distal tooth 20 of the pin 3 when the coupling members are in coupled condition are provided with co-operating retainer means which counteract mutual twisting of the coupling members from the coupled condition in a sense opposite the make-up sense (arrows 31, 32). The provision of retainers on the teeth allows to make use of the elasticity of the teeth to increase the torque required to release the coupling and thereby to make the connection more reliable without excessively loading the teeth when the retainer means have to be released. In principle the retainers can also be provided on other teeth or another number of co-operating teeth.

In the present example, the retainer means include co-operating retention surfaces 33, 83 sloping less than the engagement surfaces 29, 79 of adjacent teeth or in a sense opposite the sense in which the engagement surfaces 29, 79 of other ones of the teeth of the same coupling member are sloping. In FIG. 6 this is shown in an exaggerated representation. The teeth 20, 70 provided with retainer means also carry bevelled lead surfaces 34, 84 leading the retention surfaces 33, 83 in make-up sense. These lead surfaces 34, 84 have sloping angles which are larger than the sloping angles of the engagement surfaces 29, 79 of adjacent teeth and are sloping in the same direction as the engagement surfaces 29, 79 of the other teeth of the same coupling member.

In inserted position, just before applying a relative rotation, as shown in FIG. 6, the lead surfaces 34, 84 and the retention surfaces 33, 83 of the teeth 20, 70 project from the respective teeth to such an extent that, during make-up, the teeth 20, 70 deform elastically as the lead surfaces 34, 84 engage and slide along each other. After the lead surfaces 34, 84 have come clear of each other, the teeth 20, 70 are allowed to flex back as the retention surfaces 33, 83 overlap more and more, to finally end up in the position as shown in striped lines in FIG. 6. The retention surfaces 34, 84 are now in a pre-stressed contacting condition. To release the coupling apart from the friction between the teeth of the coupling members, an additional effort is required to again elastically deform both the tooth 20 and the counter tooth 70, thus adding to the torque needed to unscrew the coupling. The teeth 20, 70 can be made more elastic by providing slits adjacent the other tooth and essentially parallel to the retention surfaces and the lead surfaces. A further advantage of the retention means on the teeth is, that a lower axial pre-tension is sufficient to generate the required resistance against unintentional release of the coupling than if the resistance against release is exclusively obtained by friction between engagement surfaces of the teeth.

It Is observed that alternative designs of the lead surface and the retention surfaces can also provide the desired effect. The lead surfaces and the retention surfaces can for instance be connected by a curved intermediate surface.

Figure 7:
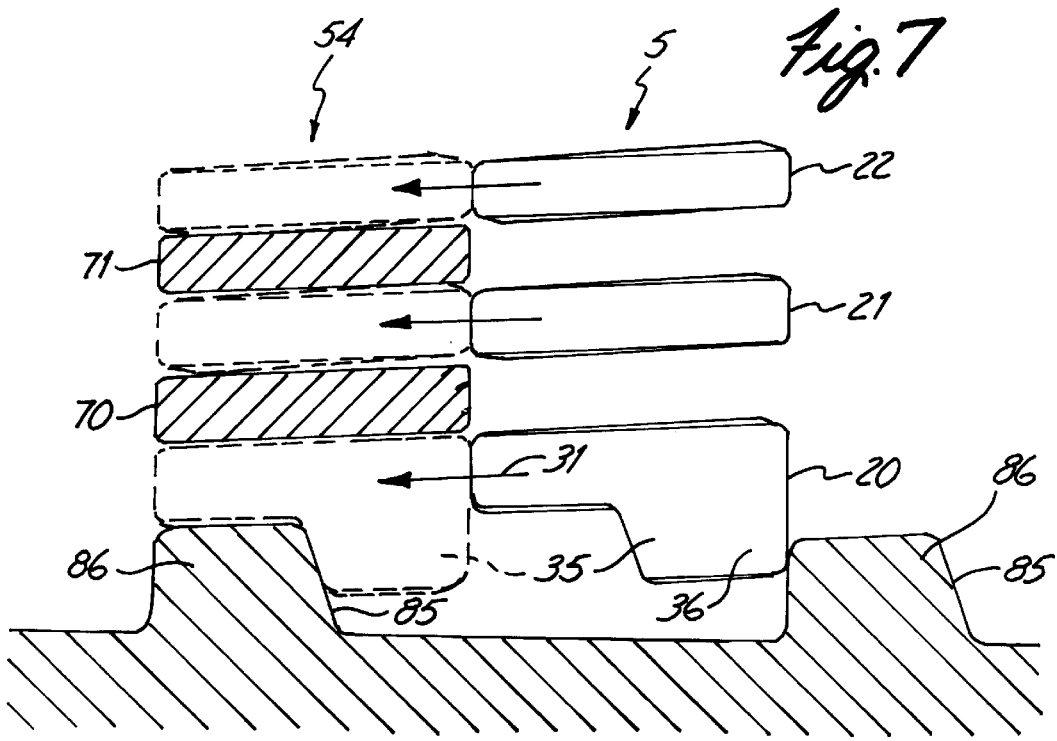

As is shown in FIGS. 1 and 2, the coupling members of the pipe coupling are each provided with abutment surfaces 35, 85. The function of the abutment surfaces is illustrated by the schematic representation in FIG. 7 of the three most distal teeth 20–22 of a column 5 of the pin 3 and the most distal two teeth 70, 71 of a column 54 of the box 53. As in FIGS. 5 and 6, the arrows 31 of which only one is designated by a reference numeral, show the movements of the teeth 20–22 of the pin 3 relative to the movements of the teeth 70, 71 of the box 53. The relative position of the columns 5 and 54 represent the positions immediately after insertion of the pin 3 in the box 53 when the teeth 20–22 are in positions in the slot 59 between two columns of counter teeth. The positions of the teeth 20–22 of the pin 3 in coupled condition are shown in dashed lines.

When the pin 3 is rotated in make-up sense relative to the box 53, the teeth 20–28 of the pin 3 move into an interleaved configuration with teeth 70–78 of the box 53. The abutment surfaces 35, 85 contact each other when the coupling members have reached the coupled condition and limit mutual rotation of the coupling members in make-up sense beyond a predetermined configuration.

Because the application of a torque in make-up sense does not lead to the exertion of substantial additional axial loads onto the teeth, the torque applied to the coupling during make-up does not have to be controlled very accurately. This in turn allows to rotate the coupling member very quickly. In combination with retention surfaces as described above, the presence of abutment members is 35, 85 is particularly useful. If, due to the retention surfaces on the teeth, a low make-up torque is sufficient to make-up the coupling with the required resistance against release of the coupling, the abutments 35, 85 ensure that in operation, torques applied to the pipes can not cause the coupling to be turned beyond the make-up condition. Another advantage of the abutments 35, 85 is that the sloping angles of the engagement surfaces 29, 79 can be selected to be very small without causing too large axial loads of the teeth if in operation a torque in make-up sense is transferred through the coupling.

Since the abutment surfaces 35, 85 are each integrally formed with the pin or the box, the abutment surfaces can withstand large torques, even though the dimensions are small and the risk of loose or broken of parts causing a malfunction of the coupling is minimized.

The abutment surface 35 is formed on a an axial projection 36 of the tooth 20. This brings about the advantage that on the one hand, the tooth 20 contributes to support the abutment surface and, on the other hand, the axial projection also forms a reinforcement of the tooth 20.

The abutment surface 85 of the box is formed on a projection 85 projecting from a circumferential wall of the box and from the bottom of the box, so that a particularly effective support of the abutment surface 85 is obtained.

The abutment surfaces 35, 85 are each formed on a radial projection 36, 86 which is located within axial contours of one of the columns 4, 5, 54 55 of teeth or counter teeth of the respective coupling member. This is advantageous to facilitate manufacturing as the slots 9, 10 between the teeth 20–28 and between the counter teeth 7–78 are not interrupted by projections. The ends of the projections 36, 86 facing in untightening sense are disposed in line with end faces of the teeth of the same column facing in untightening sense and form an obstruction for avoiding overturning of the coupling members in untightening sense.

The positions of the abutment surfaces 35, 85 are such that a predetermined amount of axial pre-tension is obtained when the abutment surfaces 35, 85 meet in completion of the make-up of the coupling. If due to wear of the engagement surfaces and/or deformation of the pin 3 or the box 53, the axial pre-tension has dropped below an acceptable level, the axial pre-tension in coupled condition can easily be increased again by removing some material from the surface of at least one of the abutment surfaces 35, 85 so that the coupling members can be twisted slightly further in make-up sense. Thus, the coupling members can easily be tuned to generate the required pre-tension. Preferably this is carried out in a standardized calibration unit, so that each first coupling member remains compatible with each second coupling member and vice versa.

Although the invention has been described in detail with reference to a preferred embodiment,.from the foregoing it will readily become apparent to those skilled in the art that many and varied changes can be made without departing from the spirit and scope of the invention.

I claim:

1. A pipe coupling comprising:

a first coupling member having a pin with a free end; and a second coupling member having a box with an open end;

said pin having an outer circumference provided with a plurality of teeth, said teeth being arranged in a plurality of circumferentially distributed axially extending columns defining slots between said columns, at least a plurality of said teeth each being provided with an engagement surface facing away from the free end of said pin;

said box having an inner circumference provided with a plurality of counter teeth, said counter teeth being arranged in a plurality of circumferentially distributed axially extending columns defining slots between said columns, said slots being dimensioned to allow axial passage of teeth of said pin and said counter teeth being dimensioned to allow axial passage through said slots defined on said pin, at least a plurality of said counter teeth each being provided with an engagement surface facing away from the open end of said box;

said pin and said box extending coaxially when in coupled condition;

said engagement surfaces of said teeth and of corresponding ones of said counter teeth being formed to generate an axial pre-tension when said coupling members are mutually twisted in a make-up sense from a configuration in which said pin is inserted in said box and in which said teeth and counter teeth of each of said coupling members are located in slots defined between counter teeth and teeth of the other one of said coupling members;

wherein at least a plurality of said engagement surfaces extend in circumferential sense at sloping angles relative to a plane perpendicular to the axis of said pin or said box, at least two of said teeth of the same one of said columns having engagement surfaces extending at different sloping angles.

2. A pipe coupling according to claim 1, further comprising a first axially facing abutment surface and a second axially facing abutment surface connected to the distal end of the box, said abutment surfaces being pressed together when the coupling is in connected condition, the pin projecting from a portion of the first coupling member carrying said first abutment surface, wherein the engagement surface of one of said at least two teeth closest to the distal end of said pin extends at a sloping angle steeper than the sloping angle of the engagement surface of at least another one of said at least two teeth of the same column.

3. A pipe coupling according to claim 1, wherein engagement surfaces of teeth and corresponding counter teeth which are mutually engaged when in coupled condition extend at mutually equal sloping angles.

4. A pipe coupling according to claim 1, wherein the engagement surface of the one of said teeth closest to the distal end of said pin has the largest one of said sloping angles, the engagement surfaces of each next one of said teeth of the same column having a sloping angle smaller than the sloping angle of the engagement surface of a previous one of said teeth.

5. A pipe coupling according to claim 1, wherein said pin and said box are cylindrically formed.

6. A pipe coupling according to claim 1, wherein leading portions in make-up sense of said engagement surfaces of said teeth and said counter teeth of said pin and said box are spaced in axial direction such that pairs of said engagement surfaces of said teeth and counter teeth which are engaged when in coupled condition engage or disengage essentially simultaneously when said coupling members are mutually twisted in tightening or untightening sense.

7. A pipe coupling according to claim 1, wherein at least a plurality of said teeth or counter teeth of each column of at least said pin or said box have at least one dimension which has a different value for each of said plurality of teeth or counter teeth in accordance with loads transferred through said teeth or counter teeth in connected condition.

8. A pipe coupling according to claim 1, wherein said teeth and counter teeth have ends leading when said coupling members are twisted in said make-up sense;
   said leading ends of at least said teeth or counter teeth being mutually staggered in circumferential sense such that, when said coupling members are mutually twisted in said make-up sense from a configuration in which said pin is inserted in said box and in which said teeth and counter teeth of each of said coupling members are located in slots defined between counter teeth and teeth of the other one of said coupling members, said teeth and counter teeth start to overlap one by one.

9. A pipe coupling according to claim 1, wherein at least one of said teeth of said pin and at least one of said counter teeth of said box engaging said at least one tooth of said pin when said coupling members are in coupled condition are provided with co-operating retainer means which counteract mutual twisting of said coupling members from said coupled condition in a sense opposite said make-up sense.

10. A pipe coupling according to claim 1, wherein said coupling members are each provided with an abutment surface facing in make-up sense, said abutment surfaces being in contact with each other when said coupling members are in coupled condition, limiting mutual rotation of said coupling members in make-up sense beyond a predetermined configuration and each being integrally formed with said pin or said box.

11. A pipe coupling comprising:
   a first coupling member having a pin with a free end; and
   a second coupling member having a box with an open end;
   said pin having an outer circumference provided with a plurality of teeth, said teeth being arranged in a plurality of circumferentially distributed axially extending columns defining slots between said columns, at least a plurality of said teeth each being provided with an engagement surface facing away from the free end of said pin;
   said box having an inner circumference provided with a plurality of counter teeth, said counter teeth being arranged in a plurality of circumferentially distributed axially extending columns defining slots between said columns, said slots being dimensioned to allow axial passage of teeth of said pin and said counter teeth being dimensioned to allow axial passage through said slots defined on said pin, at least a plurality of said counter teeth each being provided with an engagement surface facing away from the open end of said box;
   said pin and said box extending coaxially when in coupled condition;
   said engagement surfaces of said teeth and of corresponding ones of said counter teeth being formed to generate an axial pre-tension when said coupling members are mutually twisted in a make-up sense from a configuration in which said pin is inserted in said box and in which said teeth and counter teeth of each of said coupling members are located in slots defined between counter teeth and teeth of the other one of said coupling members;
   wherein at least a plurality of said teeth or counter teeth of each column of at least said pin or said box have at least one dimension which has a different value for each of said plurality of teeth or counter teeth in accordance with loads transferred through said teeth or counter teeth in connected condition,
   wherein said value of said at least one dimension of at least one said plurality of teeth or counter teeth in a central portion of each of said columns is smaller than the same dimension of at least two of said teeth of the same column located on opposite sides and closer to opposite ends of said pin or box.

12. A pipe coupling according to claim 11, wherein said dimension is the width in axial direction of said teeth.

13. A pipe coupling according to claim 11, wherein said dimension is the height in radial direction of said teeth.

14. A pipe coupling according to claim 11, wherein said pin and said box are cylindrically formed.

15. A pipe coupling comprising:
   a first coupling member having a pin with free end; and
   a second coupling member having a box with an open end;
   said pin having an outer circumference provided with a plurality of teeth, said teeth being arranged in a plurality of circumferentially distributed axially extending columns defining slots between said columns, at least a plurality of said teeth each being provided with an engagement surface facing away from the free end of said pin;
   said box having an inner circumference provided with a plurality of counter teeth, said counter teeth being arranged in a plurality of circumferentially distributed axially extending columns defining slots between said columns, said slots being dimensioned to allow axial passage of teeth of said pin and said counter teeth being dimensioned to allow axial passage through said slots defined on said pin, at least a plurality of said counter teeth each being provided with an engagement surface facing away from the open end of said box;
   said pin and said box extending coaxially when in coupled condition;
   said engagement surfaces of said teeth and of corresponding ones of said counter teeth being formed to generate an axial pre-tension when said coupling members are mutually twisted in a make-up sense from a configuration in which said pin is inserted in said box and in which said teeth and counter teeth of each of said coupling members are located in said slots defined between counter teeth and between teeth of the other one of said coupling members;
   wherein said teeth and counter teeth have leading ends which are leading when said coupling members are twisted in said make-up sense;
   said leading ends of at least said teeth or counter teeth being mutually staggered in circumferential sense such that, when said coupling members are mutually twisted in said make-up sense from a configuration in which said pin is inserted in said box and in which said teeth and counter teeth of each of said coupling members are located in slots defined between counter teeth and teeth of the other one of said coupling members, said teeth and counter teeth start to overlap one by one.

16. A pipe coupling according to claim 15, wherein at least one of said teeth and counter teeth which engage first when said coupling members are mutually twisted in said make-up sense from said configuration in which said pin is inserted in said box has an engagement surface having a bevelled or rounded lead portion first engaging one of said counter teeth or teeth of the other one of said coupling members when said coupling members are mutually twisted in a make-up sense from said configuration in which said pin is inserted in said box, said lead portion being at least more rounded or bevelled than corresponding portions of other ones of said teeth and counter teeth.

17. A pipe coupling comprising:

a first coupling member having a pin with a free end; and a second coupling member having a box with an open end;

said pin having an outer circumference provided with a plurality of teeth, said teeth being arranged in a plurality of circumferentially distributed axially extending columns defining slots between said columns, at least a plurality of said teeth each being provided with an engagement surface facing away from the free end of said pin;

said box having an inner circumference provided with a plurality of counter teeth, said counter teeth being arranged in a plurality of circumferentially distributed axially extending columns defining slots between said columns, said slots being dimensioned to allow axial passage of teeth of said pin and said counter teeth being dimensioned to allow axial passage through said slots defined on said pin, at least a plurality of said counter teeth each being provided with an engagement surface facing away from the open end of said box;

said pin and said box extending coaxially when in coupled condition;

said engagement surfaces of said teeth and of corresponding ones of said counter teeth being formed to generate an axial pre-tension when said coupling members are mutually twisted in a make-up sense from a configuration in which said pin is inserted in said box and in which said teeth and counter teeth of each of said coupling members are located in slots defined between counter teeth and teeth of the other one of said coupling members;

wherein at least one of said teeth of said pin and at least one of said counter teeth of said box engaging said at least one tooth of said pin when said coupling members are in coupled condition are provided with co-operating retainer means which counteract mutual twisting of said coupling members from said coupled condition in a sense opposite said make-up sense.

18. A pipe coupling according to claim 14, wherein said retainer means include co-operating engagement surfaces sloping less than engagement surfaces of adjacent ones of said teeth of the same coupling member or in a sense opposite the sense in which engagement surfaces of other ones of said teeth of the same coupling member are sloping.

19. A pipe coupling according to claim 17, wherein said first and second coupling members are each provided with an abutment surface, said abutment surfaces being in contact with each other when said coupling members are in coupled condition and limit mutual rotation of said coupling members in make-up sense beyond a predetermined configuration.

20. A pipe coupling comprising:

a first coupling member having a pin with a free end; and a second coupling member having a box with an open end;

said pin having an outer circumference provided with a plurality of teeth, said teeth being arranged in a plurality of circumferentially distributed axially extending columns defining slots between said columns, at least a plurality of said teeth each being provided with an engagement surface facing away from the free end of said pin;

said box having an inner circumference provided with a plurality of counter teeth, said counter teeth being arranged in a plurality of circumferentially distributed axially extending columns defining slots between said columns, said slots being dimensioned to allow axial passage of teeth of said pin and said counter teeth being dimensioned to allow axial passage through said slots defined on said pin, at least a plurality of said counter teeth each being provided with an engagement surface facing away from the open end of said box;

said pin and said box extending coaxially when in coupled condition;

said engagement surfaces of said teeth and of corresponding ones of said counter teeth being formed to generate and axial pre-tension when said coupling members are mutually twisted in a make-up sense from a configuration in which said pin is inserted in said box and in which said teeth and counter teeth of each of said coupling members are located in slots defined between counter teeth and teeth of the other one of said coupling members;

wherein said coupling members are each provided with an abutment surface facing in make-up sense, said abutment surfaces being in contact with each other when said coupling members are in coupled condition, limiting mutual rotation of said coupling members in make-up sense beyond a predetermined configuration and each being integrally formed with said pin or said box, wherein at least one of said abutment surfaces is formed by an axially projecting portion of one of said teeth or counter teeth.

21. A pipe coupling according to claim 20, wherein said abutment surfaces are each formed on a radial projection within axial contours of one of said columns of teeth or counter teeth of the respective coupling member.

* * * * *